US012623387B2

(12) United States Patent
Naito et al.

(10) Patent No.: US 12,623,387 B2
(45) Date of Patent: *May 12, 2026

(54) INJECTION MOLDING MACHINE FOR PERFORMING FOAM MOLDING AND METHOD FOR CONTROLLING INJECTION MOLDING MACHINE

(71) Applicant: THE JAPAN STEEL WORKS, LTD., Tokyo (JP)

(72) Inventors: Akihiro Naito, Tokyo (JP); Takuya Yufu, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 109 days.

This patent is subject to a terminal disclaimer.

(21) Appl. No.: 18/266,549

(22) PCT Filed: Nov. 17, 2021

(86) PCT No.: PCT/JP2021/042338
§ 371 (c)(1),
(2) Date: Jun. 9, 2023

(87) PCT Pub. No.: WO2022/124034
PCT Pub. Date: Jun. 16, 2022

(65) Prior Publication Data
US 2024/0051208 A1 Feb. 15, 2024

(30) Foreign Application Priority Data
Dec. 10, 2020 (JP) ................................. 2020-204664

(51) Int. Cl.
*B29C 45/76* (2006.01)
*B29C 44/34* (2006.01)
(Continued)

(52) U.S. Cl.
CPC .......... *B29C 45/76* (2013.01); *B29C 44/3446* (2013.01); *B29C 44/3449* (2013.01);
(Continued)

(58) Field of Classification Search
None
See application file for complete search history.

(56) References Cited

U.S. PATENT DOCUMENTS 5,622,737 A 4/1997 Hehl
6,435,853 B1 8/2002 Teraoka et al.
(Continued)

FOREIGN PATENT DOCUMENTS

CN 1380848 A 11/2002
CN 102189649 A 9/2011
(Continued)

OTHER PUBLICATIONS

FIT (Foreign Image and Tex) translation of Mayama Tsutomu, (JP 2004155134 A), Jun. 3, 2004 (Year: 2004).*
(Continued)

*Primary Examiner* — Benjamin A Schiffman
(74) *Attorney, Agent, or Firm* — Sughrue Mion, PLLC

(57) ABSTRACT

An injection molding machine includes a heating cylinder provided with a gas inlet, a screw, a gas cylinder, a pressure reducing valve configured to reduce a primary pressure of a gas from the gas cylinder to a secondary pressure, a gas supply portion configured to supply the gas at the secondary pressure to the gas inlet, a secondary pressure detection device configured to detect the secondary pressure, and a controller. The controller is configured to detect an abnormality by comparing a set pressure set in advance in the injection molding machine with the secondary pressure.

29 Claims, 6 Drawing Sheets

(51) Int. Cl.

| | |
|---|---|
| *B29C 44/42* | (2006.01) |
| *B29C 44/60* | (2006.01) |
| *B29C 45/00* | (2006.01) |
| *B29C 45/03* | (2006.01) |
| *B29C 45/17* | (2006.01) |
| *B29C 45/18* | (2006.01) |
| *B29C 45/46* | (2006.01) |
| *B29C 45/47* | (2006.01) |
| *B29C 45/74* | (2006.01) |
| *B29C 45/77* | (2006.01) |
| *B29C 45/84* | (2006.01) |

(52) U.S. Cl.
CPC ............. *B29C 44/42* (2013.01); *B29C 44/60* (2013.01); *B29C 45/0001* (2013.01); *B29C 45/03* (2013.01); *B29C 45/17* (2013.01); *B29C 45/18* (2013.01); *B29C 45/46* (2013.01); *B29C 45/47* (2013.01); *B29C 45/74* (2013.01); *B29C 45/7613* (2013.01); *B29C 45/768* (2013.01); *B29C 45/77* (2013.01); *B29C 45/84* (2013.01); *B29C 2045/1702* (2013.01); *B29C 2045/468* (2013.01); *B29C 2945/76006* (2013.01); *B29C 2945/7619* (2013.01); *B29C 2945/76361* (2013.01); *B29C 2945/76498* (2013.01); *B29C 2945/76545* (2013.01); *B29C 2945/76668* (2013.01); *B29C 2945/76839* (2013.01); *B29C 2945/76933* (2013.01)

(56) References Cited

U.S. PATENT DOCUMENTS

| | | | | |
|---|---|---|---|---|
| 11,504,891 | B2 * | 11/2022 | Naito | ................. B29C 44/3446 |
| 12,138,836 | B2 * | 11/2024 | Naito | ................. B29C 45/1816 |
| 2003/0011090 | A1 | 1/2003 | Yamaki | |
| 2012/0067438 | A1 | 3/2012 | Brand et al. | |
| 2022/0402177 | A1 * | 12/2022 | Naito | .................. B29C 45/1701 |
| 2023/0278270 | A1 * | 9/2023 | Naito | ................. B29C 44/3446 |
| 2024/0017452 | A1 * | 1/2024 | Naito | ................... B29C 44/424 |
| 2024/0042664 | A1 * | 2/2024 | Naito | ..................... B29C 45/77 |

FOREIGN PATENT DOCUMENTS

| | | | |
|---|---|---|---|
| CN | 102361735 | A | 2/2012 |
| CN | 103481479 | A | 1/2014 |
| CN | 207495895 | U | 6/2018 |
| JP | 59-71836 | A | 4/1984 |
| JP | 59-171836 | A | 9/1984 |
| JP | 61-182912 | A | 8/1986 |
| JP | 63-166513 | A | 7/1988 |
| JP | 2000-176958 | A | 6/2000 |
| JP | 2000-271978 | A | 10/2000 |
| JP | 2001-113556 | A | 4/2001 |
| JP | 2003-251672 | A | 9/2003 |
| JP | 2004-155134 | A | 6/2004 |
| JP | 2014-200937 | A | 10/2014 |
| JP | 2015-44315 | A | 3/2015 |
| JP | 2019-199025 | A | 11/2019 |
| TW | 442632 | B | 6/2001 |

OTHER PUBLICATIONS

FIT (Foreign Image and Tex) translation of Yusa Atsushi et al., (JP 2014200937 A), Oct. 27, 2014 (Year: 2014).*

International Search Report (PCT/ISA/210) issued from the International Searching Authority on Jan. 11, 2022 in International Application No. PCT/JP2021/042338.

Written Opinion (PCT/ISA/237) issued from the International Searching Authority on Jan. 11, 2022 in International Application No. PCT/JP2021/042338.

Office Action dated Jul. 3, 2025, issued by Taiwanese Patent Office in Taiwanese Patent Application No. 110146205.

Office Action dated Jun. 28, 2025, issued by Chinese Patent Office in Chinese Patent Application No. 202180082676.8.

* cited by examiner

FIG. 3

INJECTION MOLDING MACHINE FOR PERFORMING FOAM MOLDING AND METHOD FOR CONTROLLING INJECTION MOLDING MACHINE

CROSS-REFERENCE TO RELATED APPLICATIONS

This is a National Phase Entry of PCT International Application No. PCT/JP2021/042338 filed on Nov. 17, 2021, which claims priority to Japanese Patent Application No. 2020-204664 filed on Dec. 10, 2020, the contents of all which are incorporated herein by reference in their entirety.

BACKGROUND

1. Field

The present invention disclosure relates to an injection molding machine for molding a foam molded product by injecting an inert gas into an injection material, and a method for controlling such an injection molding machine.

2. Description of Related Art

An injection molding machine for obtaining a foam molded product by using a physical foaming agent, that is, an inert gas is substantially implemented as follows. That is, an injection molding machine for foam molding includes a heating cylinder and a screw. An inside of the heating cylinder is divided into a plurality of sections according to a shape of the screw, and includes, from upstream to downstream, a first compression and metering section, a starvation section, and a second compression and metering section. The heating cylinder is provided with an inert gas injection portion so as to correspond to the starvation section. An inert gas is supplied from a gas supply source such as a gas cylinder. A primary pressure of the gas supplied from the gas supply source is reduced to a secondary pressure by a pressure reducing valve. The inert gas at the secondary pressure is supplied to the injection portion.

An injection material is fed from upstream to downstream in the heating cylinder by the screw, is melted, and is kneaded in the first compression and metering section. Then, in the starvation section, a pressure of the injection material decreases, and the inert gas at the secondary pressure is injected. The injection material into which the inert gas is injected is kneaded, compressed, and metered in the second compression and metering section, and is injected into a mold to obtain a foam molded product.

In the injection molding machine for foam molding, a so-called vent-up may occur in which the injection material is pushed up in the inert gas injection portion and blocks the injection portion. An injection molding machine for foam molding described in JP2014-200937 is provided with a vent-up detection mechanism on an injection portion, performs mechanical detection when a vent-up occurs, and pushes an injection material back into a heating cylinder.

SUMMARY

In the injection molding machine for foam molding, various problems other than the vent-up may occur. For example, there may be a backflow of the inert gas or a defective supply of the inert gas. The secondary pressure of the inert gas is appropriately controlled by the pressure reducing valve, and the secondary pressure is confirmed to be a desired pressure by a pressure gauge that allows visual confirmation. The injection material is also controlled to be appropriately supplied. However, such problems may not be completely prevented, and there may be a problem that even if a problem occurs, the problem is not noticed, so that a large number of defective products may be produced.

Other problems and novel features will become apparent from the description of the present specification and the accompanying drawings.

The present disclosure relates to an injection molding machine having a following configuration. That is, the injection molding machine includes a heating cylinder provided with a gas inlet, a screw, a gas cylinder, pressure adjustment means configured to adjust a primary pressure of a gas from the gas cylinder to a secondary pressure, the gas inlet configured to supply the gas at the secondary pressure to the heating cylinder, secondary pressure detection means configured to detect the secondary pressure, and control means. The control means is configured to detect an abnormality by comparing a set pressure set in advance in the injection molding machine with the secondary pressure.

According to the present disclosure, it is possible to quickly catch a sign of occurrence of a vent-up, a backflow of a gas, a defective supply of a gas, and the like, and to prevent occurrence of a defective product.

BRIEF DESCRIPTION OF DRAWINGS

FIG. 3 is a flow chart showing a control method performed in the injection molding machine according to the present embodiment.

DETAILED DESCRIPTION

Figure 1:
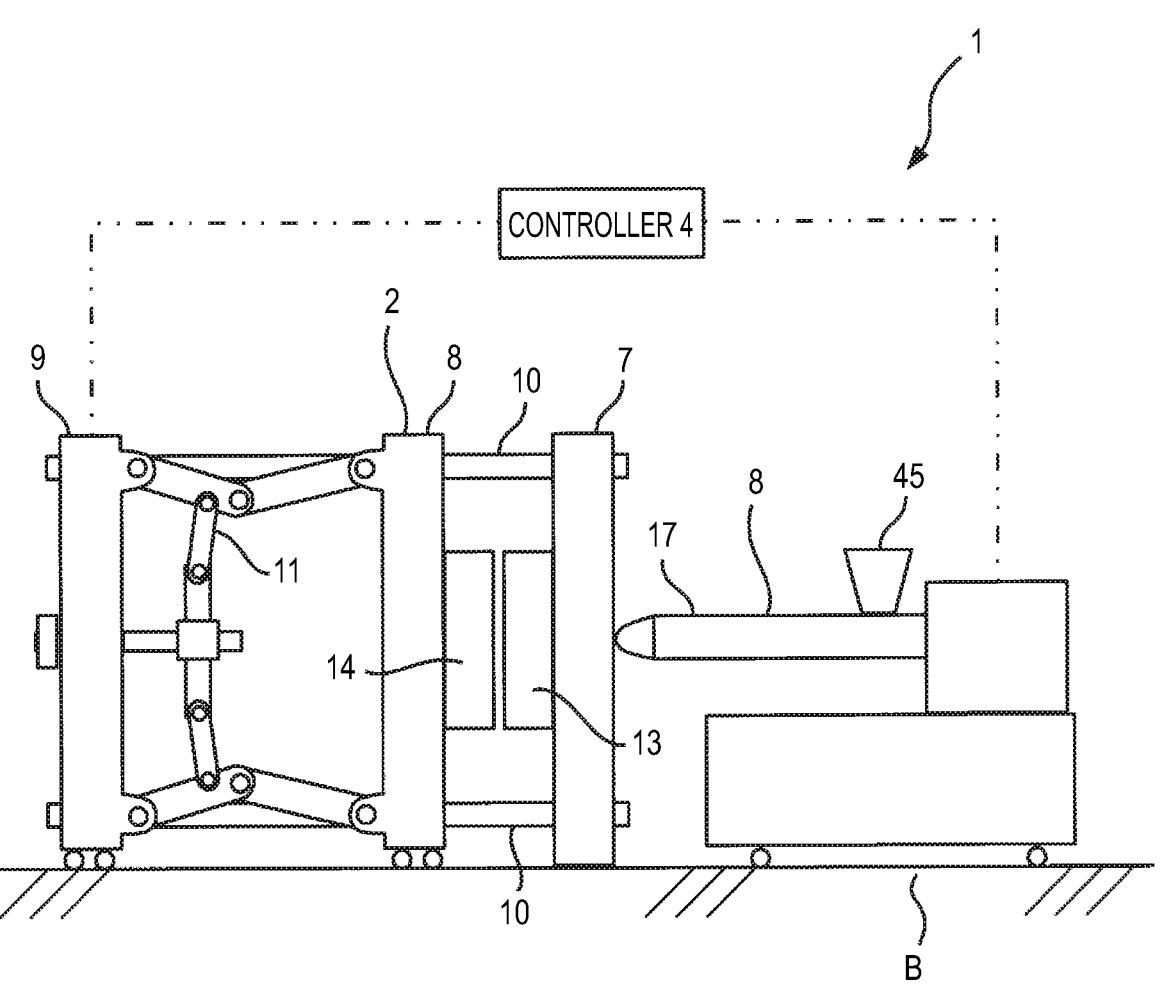
FIG. 1 is a front view showing an injection molding machine according to the present embodiment.

Hereinafter, a specific embodiment will be described in detail with reference to the drawings. However, the present invention is not limited to the following embodiment. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

The present embodiment will be described.

<Injection Molding Machine>

As shown in FIG. 1, an injection molding machine 1 according to the present embodiment generally includes a mold clamping device 2 provided on a bed B, and an injection device 3. The injection molding machine 1 is controlled by a controller 4 as control means. The mold clamping device 2 may be of a direct pressure type, but is of a toggle type in the present embodiment. That is, the mold clamping device 2 includes a fixed platen 7, a movable platen 8, a mold clamping housing 9, tie bars 10, 10, . . . connecting the mold clamping housing 9 and the fixed platen 7, and a toggle mechanism 11. In the mold clamping device 2, the fixed platen 7 and the movable platen 8 are provided with molds 13 and 14, respectively. When the toggle mechanism 11 is driven, the molds 13 and 14 are mold clamped.

<Injection Device>

Figure 2:
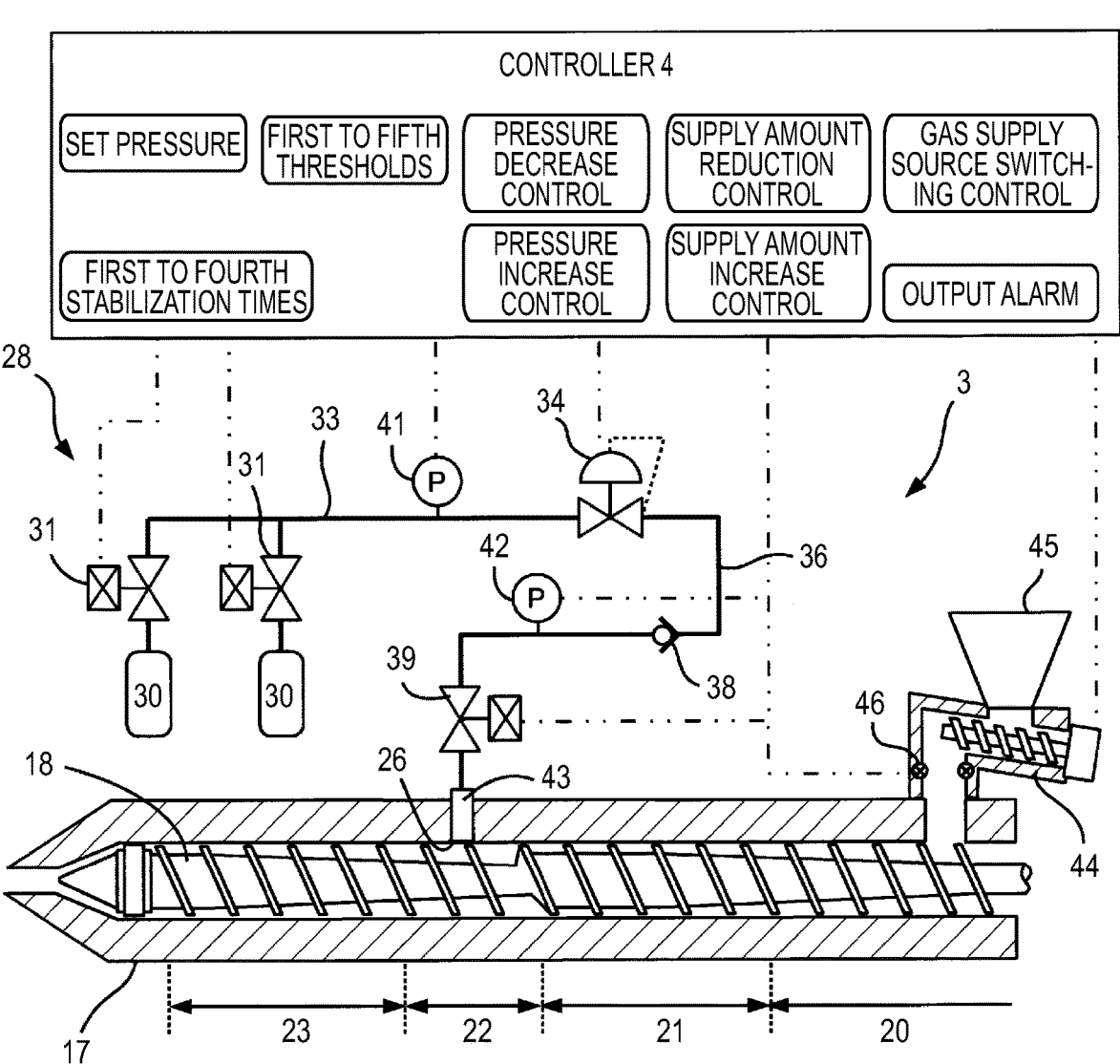
FIG. 2 is a front sectional view showing an injection device according to the present embodiment.

The injection device 3 according to the present embodiment is an injection device for foam molding using a physical foaming agent, that is, a gas. The injection device 3 is shown in FIG. 2. The injection device 3 includes a heating cylinder 17 and a screw 18 inserted in the heating cylinder 17. The screw 18 has a flight groove depth that changes from upstream toward downstream, and an inside of the heating cylinder 17 is divided into a plurality of sections. That is, from upstream, the inside of the heating cylinder 17 is divided into a supply section 20 in which an injection material is supplied and melted, a first compression and metering section 21 in which the molten injection material is compressed, a starvation section 22 in which a pressure of the injection material decreases, and a second compression and metering section 23. The heating cylinder 17 is provided with a gas inlet 26 in the starvation section 22, and a gas is injected into the injection material. The injection material and the gas are kneaded in the second compression and metering section 23.

<Gas Supply Device>

A gas supply device 28 according to the present embodiment is connected to the gas inlet 26. The gas supply device 28 includes two gas cylinders 30 and 30 as gas supply sources, gas cylinder on-off valves 31 and 31, a primary gas pipe 33 to which a gas from the gas cylinders 30 and 30 is supplied via the gas cylinder on-off valves 31 and 31, a pressure reducing valve 34 as pressure adjustment means configured to adjust a gas pressure in the primary gas pipe 33, that is, a primary pressure, a secondary gas pipe 36 to which a gas at a pressure reduced to a secondary pressure by the pressure reducing valve 34 is supplied, a check valve 38 provided in the secondary gas pipe 36, and an on-off valve 39 as on-off means also provided in the secondary gas pipe 36. The primary gas pipe 33 is provided with a primary pressure gauge 41 as primary pressure detection means configured to detect the primary pressure, and the secondary gas pipe 36 is provided with a secondary pressure gauge 42 as secondary pressure detection means configured to detect the secondary pressure. A tip end of the secondary gas pipe 36 is a gas supply portion 43 and is connected to the gas inlet 26.

Among these devices configuring the gas supply device 28, the primary pressure gauge 41 and the secondary pressure gauge 42 are connected to the controller 4, and the primary pressure and the secondary pressure are input to the controller 4. The gas cylinder on-off valves 31 and 31, the pressure reducing valve 34, and the on-off valve 39 are connected to the controller 4. The gas cylinder on-off valves 31 and 31, the pressure reducing valve 34, and the on-off valve 39 are controlled by the controller 4.

The gas supply device 28 according to the present embodiment is implemented as described above. However, the present invention can be implemented with one gas cylinder 30 or with three or more gas cylinders 30. Instead of this configuration, the gas supply device 28 may be implemented by, for example, the gas cylinders 30 and 30 and a booster, or a nitrogen generator and a booster. Generally, nitrogen, carbon dioxide, or the like, which is an inert gas, is used as the gas to be supplied, but any type of gas, such as air, hydrocarbon gas, argon, helium, or hydrogen, may be used as long as the gas dissolves in a resin. The on-off valve 39 may be provided in a middle of a gas pipe for supplying a gas at a secondary pressure to a gas inlet, or an on-off mechanism such as a needle valve that is operated by compressed air or the like may be provided in a gas injection portion. In the present embodiment, the gas cylinder on-off valves 31 and 31 serve as gas supply source switching means configured to selectively switch which of the gas cylinders 30 and 30 that are the gas supply sources is to be used. By opening or closing the gas cylinder on-off valves 31 and 31, the gas cylinders 30 and 30 to be used can be switched.

The gas cylinder on-off valve 31, the primary pressure gauge 41, the check valve 38, and the on-off valve 39 are not essential in the gas supply device 28. However, when these devices are provided, various measures can be taken when an abnormality occurs in the gas to be supplied. A plurality of devices are connected to the controller 4. However, even if only the secondary pressure gauge 42 is connected, it is possible to take a minimum measure. By monitoring the secondary pressure online, it is possible to quickly detect an abnormality.

<Feeder>

A feeder 44 is attached to the heating cylinder 17 of the injection device 3 according to the present embodiment. The feeder 44 is also connected to and controlled by the controller 4, and an amount of the injection material supplied from a hopper 45 to the heating cylinder 17 is controlled. The feeder 44 is provided with an injection material detection sensor 46 as injection material detection means, and the sensor 46 is also connected to the controller 4. Based on a signal from the injection material detection sensor 46, the controller 4 is configured to determine whether the injection material is appropriately supplied from the feeder 44. Incidentally, the injection material detection sensor 46 may be attached to the feeder 44, or may be attached to an injection material supply port of the heating cylinder 17 or the hopper 45. The injection material detection sensor 46 may be provided on a material conveying device or the like for automatically supplying the injection material to the feeder 44 or the hopper 45. In the case where the injection material detection sensor 46 is provided on the hopper 45 or the material conveying device or the like, it is sufficient to detect whether the injection material to be supplied to the feeder 44 remains.

<Controller>

In the injection molding machine 1 according to the present embodiment, as will be described in detail below, the controller 4 is configured to detect various abnormalities by monitoring the secondary pressure of the gas. In addition, when an abnormality is detected, the controller 4 is configured to take various measures according to a content of the abnormality. Various set values and programs are provided in the controller 4 in order to detect an abnormality and take measures against the abnormality. The set values include a set value for the secondary pressure of the gas, that is, a set pressure, and first to fifth thresholds and first to fourth stabilization times that are set values for determining an abnormality. The programs include programs for performing alarm output, pressure decrease control, pressure increase control, supply amount reduction control, supply amount increase control, and gas supply source switching control, and these programs are stored in the controller 4.

In the injection molding machine 1 according to the present embodiment, an amount of the gas dissolved in the injection material is controlled by a pressure of the gas supplied into the heating cylinder 17. The screw 18 disposed in the starvation section 22 has the deep flight groove depth and the large volume of the groove between the flights, and thus a pressure of a resin flowing from the upstream first compression and metering section 21 is reduced, and the injection material pressure is substantially zero. Therefore, even a gas at a relatively low pressure that can be supplied from a gas cylinder or the like can be stably supplied. The starvation section 22 of the heating cylinder 17 is filled with the gas supplied into the heating cylinder 17. Since the gas acts in an isotropic manner as a fluid pressure, the injection material pressure in the starvation section 22 is approximately equal to the secondary pressure. The gas comes into contact with the molten resin in the starvation section 22 and dissolves in an amount corresponding to the gas pressure. That is, the amount of the gas dissolved in the molten resin increases in proportion to the secondary pressure.

On the other hand, when the amount of the resin in the starvation section 22 increases and the injection material pressure increases for some reason, a vent-up may occur in which the resin enters the gas inlet 26, and the gas may not be supplied into the heating cylinder 17. At this time, the resin blocking the gas inlet 26 compresses the gas in the secondary gas pipe 36, and the secondary pressure increases. By detecting the injection material pressure, it is possible to detect a defective gas supply due to the vent-up.

When the primary pressure of the gas supplied from the gas supply source is not sufficiently high relative to the secondary pressure, due to a decrease in the secondary pressure and a reduction in the amount of the gas supplied into the heating cylinder 17, the pressure of the gas in the starvation section 22 within the heating cylinder 17 decreases, and the amount of the gas dissolved in the molten resin is reduced. At this time, by detecting the primary pressure or the decrease in the secondary pressure, it is possible to detect a defect due to an insufficient gas supply from the gas supply source.

On the other hand, in the present embodiment, the feeder 44 is used to reduce a supply amount of a resin material. Normally, the gas supplied into the heating cylinder 17 is liquid-tightly sealed by the molten resin between the starvation section 22 and the first compression and metering section 21. However, when an amount of the resin supplied from the feeder 44 is too small, or when the material runs out even if the feeder 44 is not used, the seal may be broken temporarily or continuously, and the gas may flow back to a primary side. At this time, it is possible to detect the backflow of the gas by detecting a sudden change in the secondary pressure.

When there is such a vent-up, a gas pressure decrease, a gas backflow, or the like, a molding defect frequently occurs, and thus in the injection molding machine 1 according to the present embodiment, it is important to manage the secondary pressure and detect abnormalities.

<Method for Controlling Injection Molding Machine According to Present Embodiment>

Figure 8:
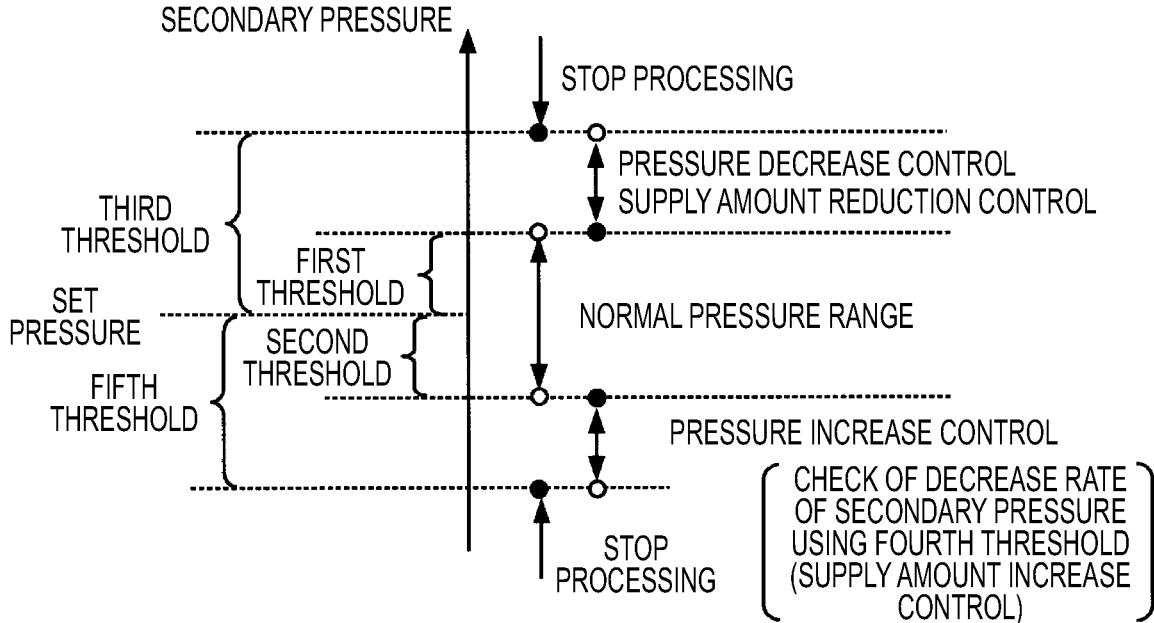
FIG. 8 is a diagram showing the method for controlling the injection molding machine according to the present embodiment, which is performed according to a secondary pressure of a gas.

Hereinafter, a method for controlling the injection molding machine according to the present embodiment will be described. In the method for controlling the injection molding machine according to the present embodiment, the secondary pressure of the gas detected by the secondary pressure gauge 42 is input to the controller 4, and the controller 4 determines a normality or an abnormality, and takes necessary measures. The controller 4 uses the first to fifth thresholds as a criterion for determining the normality or the abnormality of the secondary pressure and as a criterion for determining measures to be taken. In FIG. 8, the normality or the abnormality of the secondary pressure is determined according to the first to fifth thresholds, and measures to be taken are summarized. Hereinafter, processing executed by the controller 4 will be described with reference thereto.

<Processing Executed by Controller>

Figure 3:
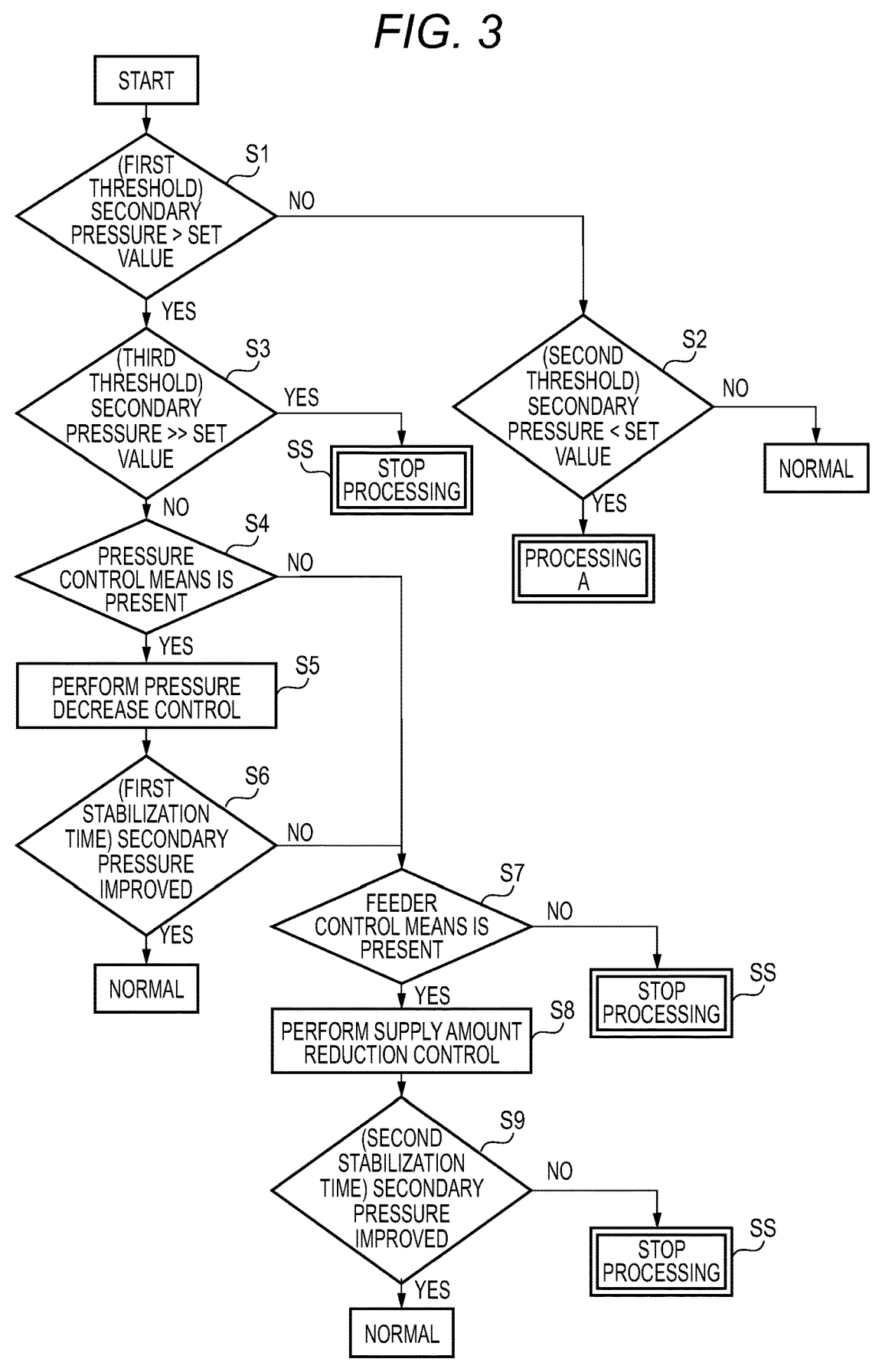

As shown in FIG. 3, the controller 4 proceeds from the start to step S1 to determine whether the secondary pressure is greater than a value that is obtained by adding the first threshold to the set value. When the secondary pressure is less than the value that is obtained by adding the first threshold to the set value, the controller 4 proceeds to step S2. In step S2, the controller 4 determines whether the secondary pressure of the gas is less than a value that is obtained by subtracting the second threshold from the set value. When the secondary pressure is greater than the value that is obtained by subtracting the second threshold from the set value, the controller 4 determines that the secondary pressure is normal. That is, with the set value as a criterion, a normal pressure range is defined as a range greater than the lower second threshold and less than the upper first threshold. When the secondary pressure is within the normal pressure range, the controller 4 determines that the secondary pressure is normal and returns to the start.

When it is determined in step S1 that the secondary pressure is greater than the set value and a difference between the secondary pressure and the set value is equal to or greater than the first threshold, the controller 4 proceeds to step S3. In step S3, the controller 4 checks whether the secondary pressure is greater than the set value and whether the difference between the secondary pressure and the set value is less than the third threshold. When the difference is equal to or greater than the third threshold, there is a high possibility that a vent-up occurs. At this time, the controller 4 executes stop processing SS.

Figure 5:
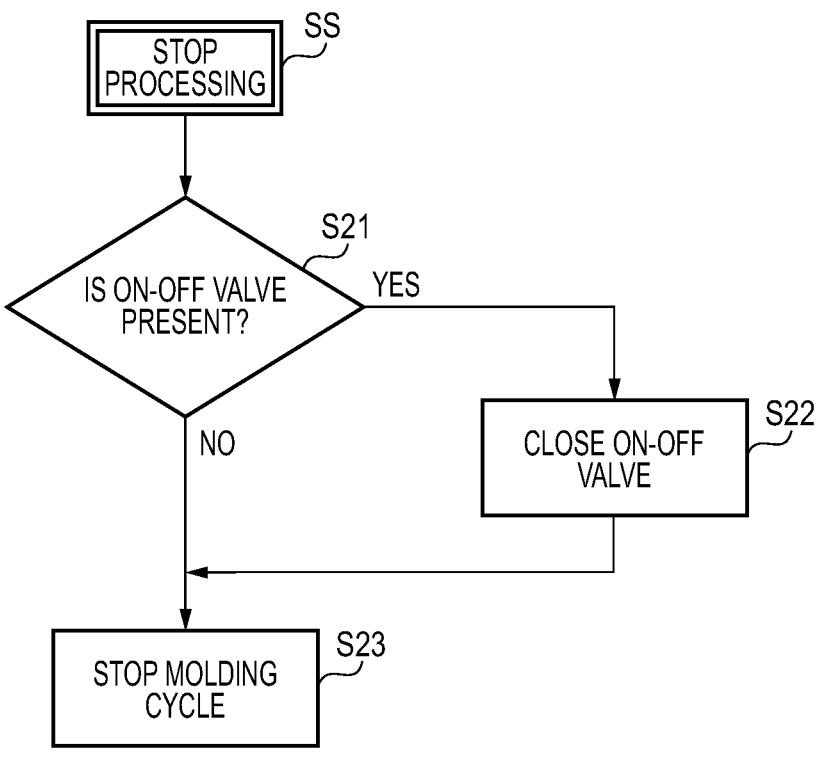
FIG. 5 is a flow chart showing the control method performed in the injection molding machine according to the present embodiment.

In the stop processing SS, as shown in FIG. 5, the controller 4 checks in step S21 whether the on-off means, that is, the on-off valve 39 can be controlled. When the on-off valve 39 is present, the controller 4 executes step S22 to close the on-off valve 39 and stop the gas supply. Next, regardless of the presence or absence of the on-off valve 39, the controller 4 executes step S23, waits for completion of a molding cycle currently being executed, and stops the molding cycle. The stop processing SS may be executed immediately or after a delay of a certain period of time or a certain cycle, depending on a cause, urgency, classification of manned and unmanned operations, and the like. The controller 4 may execute alarm processing SB to be described later simultaneously with or prior to the stop processing SS in order to inform an operator of an abnormality.

When it is determined in step S3 that the difference between the secondary pressure and the set value is less than the third threshold, the controller 4 proceeds to step S4. In step S4, the controller 4 determines whether the pressure reducing valve 34 can be operated by the controller 4, that is, whether pressure control means is present. When no pressure control means is present, the controller 4 proceeds to step S7. When it is determined in step S3 that the difference between the secondary pressure and the set value is less than the third threshold, the controller 4 may execute alarm processing SA regardless of the determination in step S4, that is, regardless of the presence or absence of the pressure control means. In the alarm processing SA, the controller 4 outputs an alarm indicating that there is a risk of a vent-up at the gas inlet 26. The alarm may be displayed as a message on a monitor attached to the controller 4, or may be output as an alarm sound from a speaker. Alternatively, the controller 4 may notify an administrator of the alarm by e-mail or the like.

When it is confirmed in step S4 that pressure control means is present, the controller 4 proceeds to step S5 and performs pressure decrease control. In the pressure decrease control, the controller 4 controls the pressure reducing valve 34 to decrease the secondary pressure to the normal pressure range. Even if the pressure reducing valve 34 is controlled to decrease the secondary pressure, a pressure of the secondary pressure gauge 42 downstream from the check valve 38 does not immediately decrease. This is because when the gas inlet 26 is not blocked by the resin, the gas in the pipe is supplied into the heating cylinder 17 and dissolved in the molten resin, so that the pressure gradually decreases.

When the pressure decrease control is performed, the controller 4 observes a progress in step S6. That is, the controller 4 monitors the secondary pressure to check whether the secondary pressure returns to the normal pressure range within the first stabilization time. When the secondary pressure returns to the normal pressure range within the first stabilization time, the controller 4 determines that the secondary pressure is normal. That is, the controller 4 returns the processing to the start. However, when the secondary pressure does not return to the normal pressure range within the first stabilization time and the difference between the secondary pressure and the set pressure is less than the third threshold, the controller 4 proceeds to step S7.

Step S7 is processing that is executed by proceeding directly from step S4 or proceeding from step S6. In step S7, the controller 4 checks whether feeder control means is present. That is, the controller 4 checks whether the feeder 44 is provided and whether the feeder 44 can be controlled by the controller 4. When no feeder control means is present, the controller 4 executes the stop processing SS already described. When feeder control means is present, the controller 4 performs the supply amount reduction control in step S8. That is, the controller 4 controls the feeder 44 to reduce the supply amount of the injection material. This is because when the supply amount of the injection material is reduced, the injection material is less likely to rise at the gas inlet.

When the supply amount reduction control is performed, the controller 4 observes a progress in step S9. That is, the controller 4 monitors the secondary pressure to check whether the secondary pressure returns to the normal pressure range within the second stabilization time. When the secondary pressure returns to the normal pressure range within the second stabilization time, the controller 4 determines that the secondary pressure is normal. That is, the controller 4 returns the processing to the start. However, when the secondary pressure does not return to the normal pressure range within the second stabilization time, the controller 4 executes the stop processing SS already described.

Figure 4:
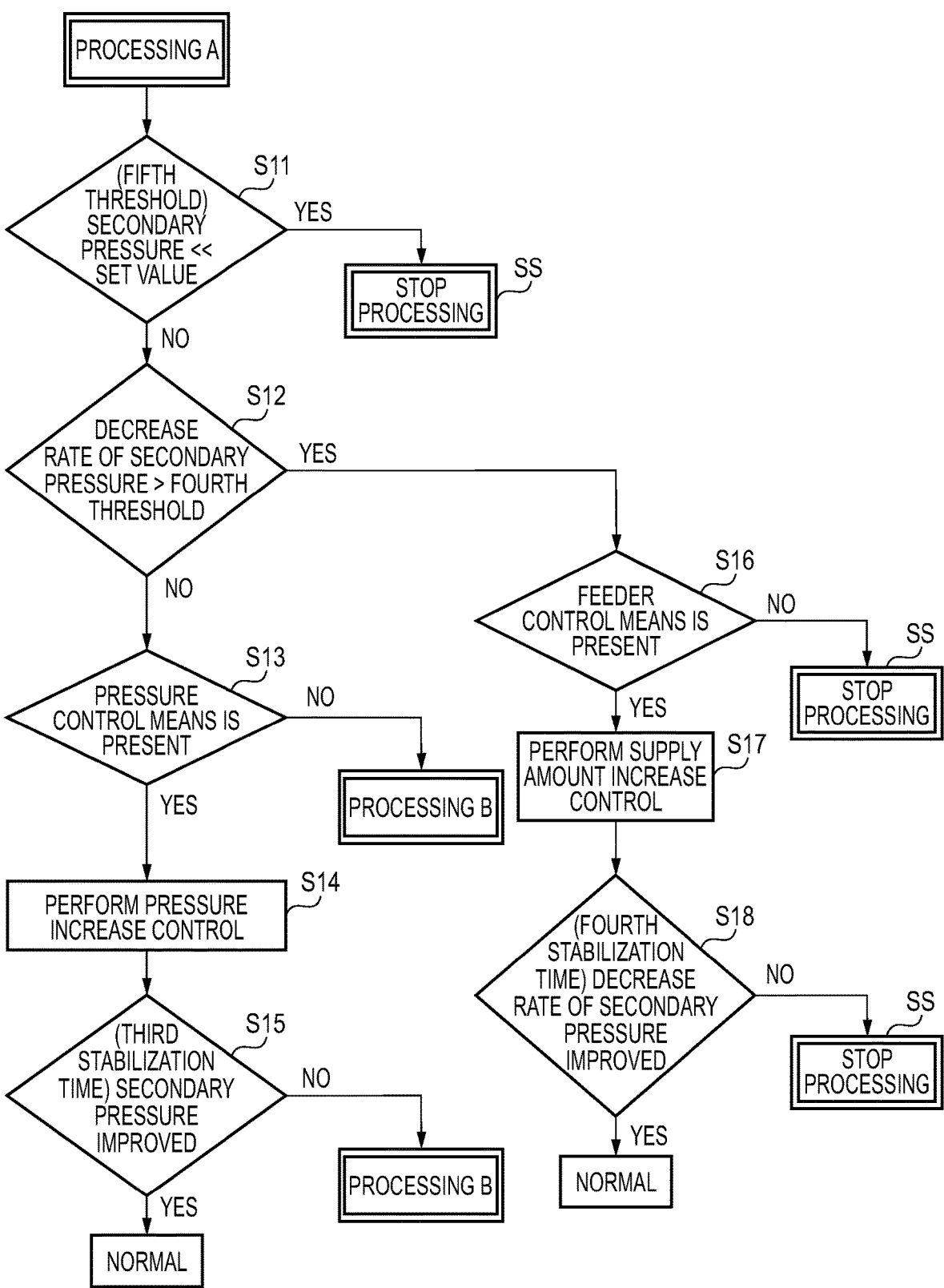
FIG. 4 is a flow chart showing the control method performed in the injection molding machine according to the present embodiment.

When it is determined in step S2 that the secondary pressure of the gas is less than the set value by the second threshold or more, the controller 4 proceeds to processing A. The controller 4 proceeds to step S11 as shown in FIG. 4. In step S11, the controller 4 checks whether the secondary pressure of the gas falls below the set pressure and whether the difference with the set pressure is equal to or greater than the fifth threshold. When the difference is equal to or greater than the fifth threshold, the controller 4 determines that a gas supply abnormality occurs, and executes the stop processing SS already described. On the other hand, when the difference between the secondary pressure and the set pressure is less than the fifth threshold, the controller 4 proceeds to step S12.

In step S12, the controller 4 confirms a decrease rate of the secondary pressure of the gas. That is, the controller 4 calculates a ratio of decrease per unit time, that is, the decrease rate of the secondary pressure of the gas, and checks whether the decrease rate is equal to or greater than the fourth threshold. When the decrease rate is equal to or greater than the fourth threshold, there is a high possibility that the gas instantaneously flows back into the heating cylinder 17. In this case, the controller 4 proceeds to step S16.

In step S16, the controller 4 checks whether the feeder control means is present. That is, the controller 4 checks whether the injection molding machine 1 includes the feeder 44 and whether the feeder 44 can be controlled by the controller 4. When no feeder control means is present, the controller 4 executes the stop processing SS already described. When feeder control means is present, the controller 4 performs the supply amount increase control in step S17. That is, the controller 4 controls the feeder 44 to increase the supply amount of the injection material. This is because when the supply amount of the injection material increases, an amount of resin in a sealing portion increases, and the backflow of the gas can be prevented in a liquid-tight manner.

When the supply amount increase control is performed, the controller 4 observes a progress in step S18. When the decrease rate of the secondary pressure falls below the fourth threshold during the number of molding cycles serving as a criterion, for example, five molding cycles, the secondary pressure may be determined to be normal. Alternatively, when the decrease rate of the secondary pressure falls below the fourth threshold during the fourth stabilization time serving as a criterion, the secondary pressure may be determined to be normal. At this time, several shots may be required until an effect of the supply amount increase control appears, and thus a delay time may be provided in which the progress observation is not determined during the number of times serving as the criterion or the time serving as the criterion. When the decrease rate of the secondary pressure is equal to or greater than the fourth threshold even if the supply amount increase control is performed, the controller 4 executes the stop processing SS already described.

When it is determined in step S12 that the decrease rate of the secondary pressure of the gas is less than the fourth threshold, the controller 4 determines that there is a high possibility that a supply pressure from the gas supply source, that is, the primary pressure decreases, and proceeds to step S13.

Figure 6:
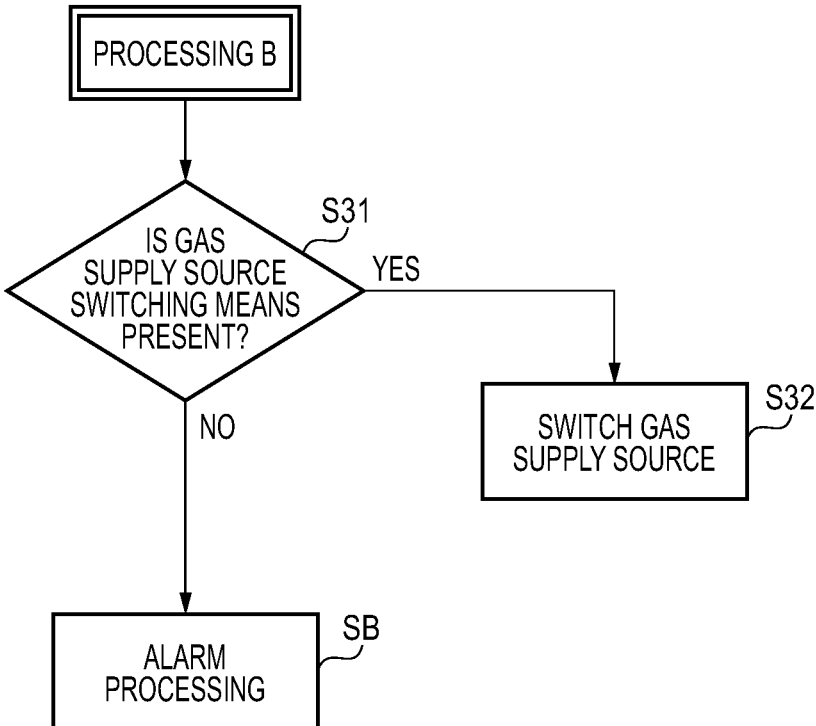
FIG. 6 is a flow chart showing the control method performed in the injection molding machine according to the present embodiment.

In step S13, the controller 4 checks whether pressure control means is present. When no pressure control means is present, the controller 4 proceeds to processing B. The processing B is shown in FIG. 6. The controller 4 first executes step S31. That is, the controller 4 checks whether gas supply source switching means is present. In the present embodiment, the gas supply source switching means refers to the gas cylinder on-off valves 31 and 31, which switch the gas cylinders 30 and 30 that are the gas supply sources. When it is determined that gas supply source switching means is present, the controller 4 executes step S32 to operate the gas cylinder on-off valves 31 and 31 to perform the gas supply source switching control to switch the gas cylinder 30 currently being used to another gas cylinder 30.

When no gas supply source switching means is present, or when the secondary pressure does not return to the normal range even if the gas supply source switching control is performed, the controller 4 executes the alarm processing SB and issues an alarm for prompting replacement of the gas cylinder 30. The alarm may be a message output to a monitor, an alarm sound output to a speaker, or e-mail transmission to an administrator. The stop processing may be executed simultaneously with the alarm processing SB.

When it is determined in step S13 that pressure control means is present, the controller 4 proceeds to step S14.

In step S14, the controller 4 performs the pressure increase control. That is, the pressure reducing valve 34 is controlled such that the secondary pressure is within the normal pressure range.

When the pressure increase control is performed, the controller 4 observes a progress in step S15. That is, the controller 4 monitors the secondary pressure to check whether the secondary pressure returns to the normal pressure range within the third stabilization time. When the secondary pressure returns to the normal pressure range within the third stabilization time, the controller 4 determines that the secondary pressure is normal. That is, the controller 4 returns the processing to the start. However, when the secondary pressure does not return to the normal pressure range within the third stabilization time and the difference between the secondary pressure and the set pressure is less than the fifth threshold, the controller 4 executes the processing B already described.

Figure 7:
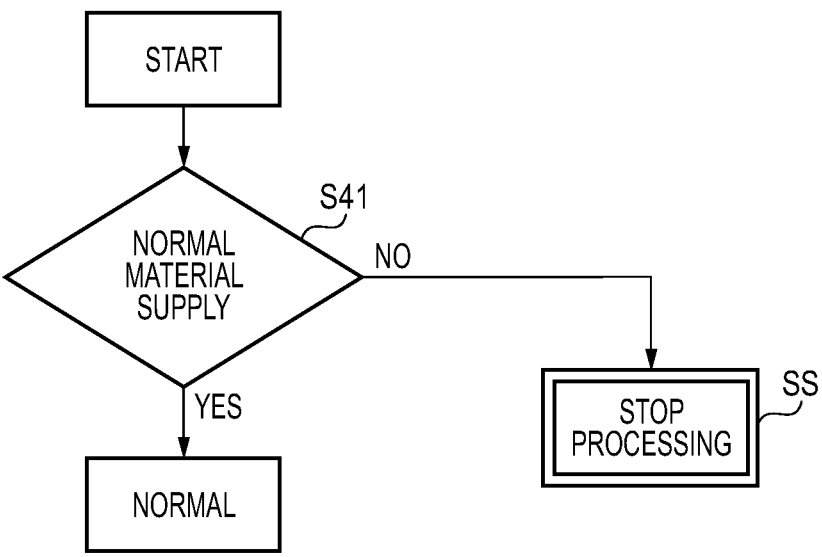
FIG. 7 is a flow chart showing the control method performed in the injection molding machine according to the present embodiment.

In the injection molding machine 1 according to the present embodiment, the controller 4 also checks whether the supply of the injection material is normal. That is, the controller 4 executes step S41 as shown in FIG. 7. The controller 4 checks whether the injection material falls into the heating cylinder 17 at a predetermined interval by using the injection material detection sensor 46. When the supply of the injection material is not normal, there is a possibility that the seal is broken and the gas flows back to a feeder side due to an injection material shortage, and thus the stop processing SS already described is to be executed.

Incidentally, in S13 and S15 of the present embodiment, the controller 4 uses the first, second, fourth, and fifth thresholds and the presence or absence of the pressure control means as a determination criterion for executing the processing B, that is, the gas supply source switching control. However, the controller 4 may also use a difference between the primary pressure and the set pressure or the secondary pressure more directly as the determination criterion. In this case, the controller 4 may use a sixth threshold as the determination criterion for the difference between the primary pressure and the set pressure or the secondary pressure, and execute the processing B when the difference between the primary pressure and the set pressure or the secondary pressure is less than the sixth threshold. The sixth threshold may be appropriately determined according to an amount of the gas used, and for example, 1 MPa may be used as one criterion.

The above is the method for controlling the injection molding machine according to the present embodiment, and it has been described that the first and second thresholds and the like are used for the set pressure to determine the normality or the abnormality of the secondary pressure or the like. The secondary pressure depends on a size of a molding machine and a configuration of a gas supply device, but even within a range of normal use of a molding machine, the secondary pressure may vary in a range of about 0 MPa to 0.5 MPa for a standard size molding machine and in a range of about 0.5 MPa to 1.0 MPa for a large molding machine due to gas dissolution in an injection material. Therefore, it is preferable that the first and second thresholds are set in a range of 0.1 MPa to 1.5 MPa, and more preferably a range of 0.2 MPa to 1.0 MPa. The third and fifth thresholds need to be greater than the first and second thresholds, and may be appropriately determined, for example, in a range of 0.5 MPa to 3.0 MPa according to a varied range of a gas pressure.

However, ratios may be used in such a determination. For example, the normal range of the secondary pressure may be 95% to 110% of the set pressure. Determination using the ratios in this way is substantially the same as the determination using the first and second thresholds. That is, setting the first and second thresholds within the above numerical range is the same as setting the first threshold to 10% of the set pressure and the second threshold to 5% of the set pressure.

It is also possible to use upper and lower limits of the normal range. For example, when a gas pressure set value is set to 10 MPa, the normal range may be from 10.5 MPa to 9.5 MPa. However, in this case, a value of the normal range needs to be changed every time the gas pressure set value is changed, and thus it is preferable to perform the determination using the first and second thresholds or the ratios to save trouble of a user.

In the present embodiment, a form using the secondary pressure gauge 42 has been described. Alternatively, instead of using the secondary pressure gauge 42, a pressure switch may be used. In this case, an upper limit, a lower limit, and the like of the normal range corresponding to the first, second, third, and fifth thresholds may be set for the pressure switch, and the controller 4 may receive a signal from the pressure switch when the secondary pressure is out of the normal range. The setting of the pressure switch may be performed manually, or may be performed by communicating with the controller 4. However, in a case of performing the setting manually, the setting of the pressure switch needs to be changed every time the gas pressure set value is changed. Therefore, it is preferable to communicate with the controller 4 and set the pressure switch in conjunction with the set value to save the trouble of the user.

Further, detection of a pressure decrease rate of the fourth threshold may be performed by detecting the backflow of the gas in the heating cylinder based on a gas flow rate using a flowmeter or a differential pressure gauge, instead of detecting a pressure decrease rate of the secondary pressure gauge 42. This is because a decrease in the secondary pressure due to the backflow is the same as an increase in the gas flow rate. When using a flowmeter or a differential pressure gauge, a flow rate of a gas to be used in a normal operating range can be measured in advance, and a range exceeding the flow rate can be used as an alternative index for the fourth threshold.

The method for controlling the injection molding machine according to the present embodiment can be applied to a case of having a plurality of gas pressure set values and performing control to change a pressure stepwise. In this case, the first and second thresholds and the like may be set so as to include maximum and minimum values of the plurality of gas pressure set values, or set values corresponding to the first and second thresholds may be set for each gas pressure set value.

Although the invention made by the present inventor has been specifically described above based on the embodiment, the present invention is not limited to the embodiment described above. It is needless to say that various modifications can be made without departing from the scope of the invention, such as changing the order of each step, or executing the alarm processing SA or the stop processing SS only when the secondary pressure is out of the normal range. In addition, the measures may be changed between a case of an attended operation and a case of an unattended operation. For example, in the case of the attended operation, a guideline for changing molding conditions may be displayed in a guidance manner instead of the supply amount increase control or the supply amount reduction control for the feeder 44, or in a case where the urgency is low, the processing may be stopped at the alarm processing to wait for measures of the operator, instead of executing the stop processing SS. A plurality of examples described above may be implemented in combination as appropriate.

Here, features of the embodiment of the injection molding machine for foam molding and the method for controlling the injection molding machine according to the present invention described above are briefly summarized in [1] to [28] below, respectively.

[1]

An injection molding machine (1) including:

a heating cylinder (17) having a gas inlet (26);

a screw (18) drivable in the heating cylinder (17);

a gas supply device (28) configured to supply a gas to the gas inlet (26); and control means (4), in which the gas supply device (28) includes:

a gas supply source (30) configured to supply a gas, pressure adjustment means (34) configured to adjust a primary pressure of a gas from the gas supply source (30) to a secondary pressure; and secondary pressure detection means (42) configured to detect the secondary pressure, in which the gas supply device is configured to supply the gas at the secondary pressure to the gas inlet (26), and in which the control means (4) is configured to detect an abnormality by comparing a set pressure with the secondary pressure.

[2]

The injection molding machine (1) according to [1], in which the control means (4) is configured to detect an abnormality of the second pressure based on a normal pressure range, the normal pressure range, which is a normal pressure range of the secondary pressure, being greater than a value that is obtained by subtracting a second threshold from the set pressure and being less than a value that is obtained by adding a first threshold to the set pressure.

[3]

The injection molding machine (1) according to [2], in which in a case where the secondary pressure is greater than the normal pressure range and the secondary pressure is less than a value that is obtained by adding a third threshold to the set pressure, the control means (4) issues an alarm indicating a risk of a vent-up at the gas inlet (26).

[4]

The injection molding machine (1) according to [2], in which in a case where the secondary pressure is equal to or greater than a value that is obtained by adding a third threshold to the set pressure, the control means (4) stops a molding cycle after completion of the molding cycle being executed.

[5]

The injection molding machine (1) according to [2], in which the gas supply device (28) includes a gas pipe configured to supply the gas at the secondary pressure to the gas inlet (26) or on-off means (39) disposed at a gas injection portion, and in which in a case where the secondary pressure is equal to or greater than a value that is obtained by adding a third threshold to the set pressure, the control means (4) closes the on-off means (39) and stops a molding cycle after completion of the molding cycle being executed.

[6]

The injection molding machine (1) according to [2], in which the control means (4) includes pressure control means configured to control the pressure adjustment means (34), and in which in a case where the secondary pressure is greater than the normal pressure range and the secondary pressure is less than a value that is obtained by adding a third threshold to the set pressure, the control means performs pressure decrease control to cause the secondary pressure to fall within the normal pressure range by the pressure control means.

[7]

The injection molding machine (1) according to [6], in which in a case where the secondary pressure continuously exceeds the normal pressure range during a first stabilization time from a start of the pressure decrease control, the control means (4) stops a molding cycle after completion of the molding cycle being executed.

[8]

The injection molding machine (1) according to [6], in which the gas supply device (28) includes a gas pipe configured to supply the gas at the secondary pressure to the gas inlet (26) or on-off means (39) disposed at a gas injection portion, and in which in a case where the secondary pressure continuously exceeds the normal pressure range during a first stabilization time from a start of the pressure decrease control, the control means (4) closes the on-off means (39) and stops a molding cycle after completion of the molding cycle being executed.

[9]

The injection molding machine (1) according to [6], in which a feeder (44) configured to adjust a supply amount of an injection material is attached to the heating cylinder (17), and in which in a case where the secondary pressure continuously exceeds the normal pressure range during a first stabilization time from a start of the pressure decrease control, the control means (4) performs supply amount reduction control including reducing the supply amount of the injection material by controlling the feeder (44).

[10]

The injection molding machine (1) according to [2], in which a feeder (44) configured to adjust a supply amount of an injection material is attached to the heating cylinder (17), and in which in a case where the secondary pressure is greater than the normal pressure range and the secondary pressure is less than a value that is obtained by adding a third threshold to the set pressure, the control means (4) performs supply amount reduction control including reducing the supply amount of the injection material by controlling the feeder (44).

[11]

The injection molding machine (1) according to [9] or [10], in which in a case where the secondary pressure continuously exceeds the normal pressure range during a second stabilization time from a start of the supply amount reduction control, the control means (4) stops a molding cycle after completion of the molding cycle being executed.

[12]

The injection molding machine (1) according to [9] or [10], in which the gas supply device (28) includes a gas pipe configured to supply the gas at the secondary pressure to the gas inlet (26) or on-off means (39) at a gas injection portion, and in which in a case where the secondary pressure continuously exceeds the normal pressure range during a second stabilization time from a start of the supply amount reduction control, the control means (4) closes the on-off means (39) and stops a molding cycle after completion of the molding cycle being executed.

[13]

The injection molding machine (1) according to [2], in which in a case where the secondary pressure is less than the normal pressure range and a decrease rate of the secondary pressure is equal to or greater than a fourth threshold, the control means (4) stops a molding cycle after completion of the molding cycle being executed.

[14]

The injection molding machine (1) according to [2], in which the gas supply device (28) includes a gas pipe configured to supply the gas at the secondary pressure to the gas inlet (26) or on-off means (39) disposed at a gas injection portion, and in which in a case where the secondary pressure is less than the normal pressure range and a decrease rate of the secondary pressure is equal to or greater than a fourth threshold, the control means (4) closes the on-off means (39) and stops a molding cycle after completion of the molding cycle being executed.

[15]

The injection molding machine (1) according to [2], in which a feeder (44) configured to adjust a supply amount of an injection material is attached to the heating cylinder (17), and in which in a case where the secondary pressure is greater than a value that is obtained by subtracting a fifth threshold from the set pressure, and a decrease rate of the secondary pressure is equal to or greater than a fourth threshold, the control means (4) performs supply amount increase control including increasing the supply amount of the injection material by controlling the feeder (44).

[16]

The injection molding machine (1) according to [15], in which in a case where the decrease rate of the secondary pressure temporarily exceeds the fourth threshold during a predetermined cycle from a start of the supply amount increase control or during a fourth stabilization time from the start of the supply amount increase control, the control means (4) stops a molding cycle after completion of the molding cycle being executed.

[17]

The injection molding machine (1) according to [15], in which the gas supply device (28) includes a gas pipe configured to supply the gas at the secondary pressure to the gas inlet (26) or on-off means (39) disposed at a gas injection portion, and in which in a case where the decrease rate of the secondary pressure temporarily exceeds the fourth threshold during a predetermined cycle from a start of the supply amount increase control or during a fourth stabilization time from the start of the supply amount increase control, the control means (4) closes the on-off means (39) and stops a molding cycle after completion of the molding cycle being executed.

[18]

The injection molding machine (1) according to [2], in which in a case where the secondary pressure is equal to or less than a value that is obtained by subtracting a fifth threshold from the set pressure, the control means (4) stops a molding cycle after completion of the molding cycle being executed.

[19]

The injection molding machine (1) according to [2], in which the gas supply device (28) includes a gas pipe configured to supply the gas at the secondary pressure to the gas inlet (26) or on-off means (39) disposed at a gas injection portion, and in which in a case where the secondary pressure is equal to or less than a value that is obtained by subtracting a fifth threshold from the set pressure, the control means (4) closes the on-off means (39) and stops a molding cycle after completion of the molding cycle being executed.

[20]

The injection molding machine (1) according to [2], in which in a case where the secondary pressure falls below the normal pressure range but is greater than a value that is obtained by subtracting a fifth threshold from the set pressure, and a decrease rate of the secondary pressure is less than a fourth threshold, the control means (4) issues an alarm for prompting replacement of the gas supply source (30).

[21]

The injection molding machine (1) according to [2], in which the gas supply device (28) includes:

a plurality of the gas supply sources (30); and gas supply source switching means (31) configured to selectively switch one gas supply source (30) to be used from the plurality of gas supply sources (30), and in which in a case where the secondary pressure falls below the normal pressure range but is greater than a value that is obtained by subtracting a fifth threshold from the set pressure, and a decrease rate of the secondary pressure is less than a fourth threshold, the control means (4) switches the gas supply source (30) currently being used to another gas supply source (30) by the gas supply source switching means (31).

[22]

The injection molding machine (1) according to [2], in which the control means (4) includes pressure control means configured to control the pressure adjustment means (34), and in which in a case where the secondary pressure falls below the normal pressure range but is greater than a value that is obtained by subtracting a fifth threshold from the set pressure, and a decrease rate of the secondary pressure is less than a fourth threshold, the control means performs pressure increase control to cause the secondary pressure to fall within the normal pressure range by the pressure control means.

[23]

The injection molding machine (1) according to [22], in which in a case where the secondary pressure falls below the normal pressure range and is maintained at a value greater than a value that is obtained by subtracting the fifth threshold from the set pressure during a third stabilization time from a start of the pressure increase control, the control means (4) issues an alarm for prompting replacement of the gas supply source (30).

[24]

The injection molding machine (1) according to [22], in which the gas supply device (28) includes:

a plurality of the gas supply sources (30); and gas supply source switching means (31) configured to selectively switch one gas supply source (30) to be used from the plurality of gas supply sources (30), and in which in a case where the secondary pressure falls below the normal pressure range and is maintained at a value greater than a value that is obtained by subtracting the fifth threshold from the set pressure during a third stabilization time from a start of the pressure increase control, the control means (4) switches the gas supply source (30) currently being used to another gas supply source (30) by the gas supply source switching means (31).

[25]

The injection molding machine (1) according to any one of [1] to [24], in which the gas supply device (28) includes:

a plurality of the gas supply sources (30);

gas supply source switching means (31) configured to selectively switch one gas supply source (30) to be used from the plurality of gas supply sources (30); and primary pressure detection means (41) configured to detect the primary pressure of the gas from the gas supply source (30), and in which the control means (4) is configured to:

detect a pressure decrease in the gas supply source (30) by comparing a difference between the primary pressure and the set pressure or the secondary pressure; and based on detecting the pressure decrease in the gas supply source (30), switch the gas supply source (30) currently being used to another gas supply source (30) by the gas supply source switching means (31).

[26]

The injection molding machine (1) according to [2], further including:

injection material detection means (46) configured to confirm a supply of an injection material to the heating cylinder (17), in which in a case where the injection material is interrupted and an injection material shortage is detected, the injection material detection means (46) stops a molding cycle after completion of the molding cycle being executed.

[27]

The injection molding machine (1) according to [2], further including:

injection material detection means (46) configured to confirm a supply of an injection material to the heating cylinder (17), in which the gas supply device (28) includes a gas pipe configured to supply the gas at the secondary pressure to the gas inlet (26) or on-off means (39) disposed at a gas injection portion, and in which in a case where the injection material is interrupted and an injection material shortage is detected, the injection material detection means (46) closes the on-off means (39) and stops a molding cycle after completion of the molding cycle being executed.

[28]

A method for controlling an injection molding machine, the injection molding machine including:

a heating cylinder (17) provided with a gas inlet (26);

a screw (18) drivable in the heating cylinder (17); and a gas supply device (28) configured to supply a gas to the gas inlet (26), the gas supply device (28) including:

a gas supply source (30) configured to supply a gas;

pressure adjustment means (34) configured to adjust a primary pressure of a gas from the gas supply source (30) to a secondary pressure; and secondary pressure detection means (42) configured to detect the secondary pressure, the gas supply device being configured to supply the gas at the secondary pressure to the gas inlet (26), the method including:

detecting an abnormality by comparing a set pressure with the secondary pressure.

According to the present disclosure, it is possible to quickly catch a sign of occurrence of a vent-up, a backflow of a gas, a defective supply of a gas, and the like, and to prevent occurrence of a defective product. The present invention having this effect is useful in an injection molding machine for foam molding and a method for controlling the injection molding machine.

The invention claimed is:

1. An injection molding machine comprising:

a heating cylinder having a gas inlet;

a screw drivable in the heating cylinder;

a gas supply device configured to supply a gas to the gas inlet; and a controller, wherein an inside of the heating cylinder is divided into a plurality of sections, and from upstream, the inside of the heating cylinder is divided into a first compression and metering section in which the molten injection material is compressed, a starvation section in which a pressure of the injection material decreases, and a second compression and metering section in which the injection material is compressed again, and wherein the gas inlet is provided in the starvation section, wherein the gas supply device comprises:

a gas supply source configured to supply a gas;

a pressure adjustment device configured to adjust a primary pressure of a gas from the gas supply source to a secondary pressure;

a check valve provided downstream of the pressure adjustment device; and a secondary pressure detection device configured to detect the secondary pressure at a downstream of the check valve, wherein the gas inlet is connected to the heating cylinder downstream of the check valve, and the gas supply device is configured to supply the gas at the secondary pressure to the gas inlet, wherein the controller is configured to detect an abnormality in a case where the secondary pressure becomes out of a normal pressure range, and wherein the normal pressure range, which is a normal pressure range of the secondary pressure, is greater than a value that is obtained by subtracting a second threshold from a set pressure for the gas at the secondary pressure and is less than a value that is obtained by adding a first threshold to the set pressure, the first threshold being a value of 0.1 MPa to 1.5 MPa, and the second threshold being a value of 0.1 MPa to 1.5 MPa.

2. The injection molding machine according to claim 1, wherein the controller is configured to determine whether the secondary pressure is greater than the normal pressure range and the secondary pressure is less than a value that is obtained by adding a third threshold, which is greater than the first threshold, to the set pressure, and the controller is configured to issue an alarm indicating a risk of a vent-up at the gas inlet based on the determination.

3. The injection molding machine according to claim 1, wherein the controller is configured to determine whether the secondary pressure is equal to or greater than a value that is obtained by adding a third threshold, which is greater than the first threshold, to the set pressure, and the controller is configured to stop a molding cycle after completion of the molding cycle being executed based on the determination.

4. The injection molding machine according to claim 1,
wherein the gas supply device comprises a gas pipe configured to supply the gas at the secondary pressure to the gas inlet or an on-off device disposed at a gas injection portion, and
wherein the controller is configured to determine whether the secondary pressure is equal to or greater than a value that is obtained by adding a third threshold, which is greater than the first threshold, to the set pressure, and the controller is configured to close the on-off device and stops a molding cycle after completion of the molding cycle being executed based on the determination.

5. The injection molding machine according to claim 1,
wherein the controller comprises a pressure controller configured to control the pressure adjustment device, and
wherein the controller is configured to determine whether the secondary pressure is greater than the normal pressure range and the secondary pressure is less than a value that is obtained by adding a third threshold, which is greater than the first threshold, to the set pressure, and the controller is configured to perform pressure decrease control to cause the secondary pressure to fall within the normal pressure range by the pressure controller based on the determination.

6. The injection molding machine according to claim 5, wherein the controller is configured to determine whether the secondary pressure continuously exceeds the normal pressure range during a first stabilization time from a start of the pressure decrease control, and the controller is configured to stop a molding cycle after completion of the molding cycle being executed based on the determination.

7. The injection molding machine according to claim 5,
wherein the gas supply device comprises a gas pipe configured to supply the gas at the secondary pressure to the gas inlet or an on-off device disposed at a gas injection portion, and
wherein the controller is configured to determine whether the secondary pressure continuously exceeds the normal pressure range during a first stabilization time from a start of the pressure decrease control, and the controller is configured to close the on-off device and stops a molding cycle after completion of the molding cycle being executed based on the determination.

8. The injection molding machine according to claim 5,
wherein a feeder configured to adjust a supply amount of an injection material is attached to the heating cylinder, and wherein the controller is configured to determine whether the secondary pressure continuously exceeds the normal pressure range during a first stabilization time from a start of the pressure decrease control, and the controller is configured to perform supply amount reduction control including reducing the supply amount of the injection material by controlling the feeder based on the determination.

9. The injection molding machine according to claim 1,
wherein a feeder configured to adjust a supply amount of an injection material is attached to the heating cylinder, and
wherein the controller is configured to determine whether the secondary pressure is greater than the normal pressure range and the secondary pressure is less than a value that is obtained by adding a third threshold, which is greater than the first threshold, to the set pressure, and the controller is configured to perform supply amount reduction control including reducing the supply amount of the injection material by controlling the feeder based on the determination.

10. The injection molding machine according to claim 8, wherein the controller is configured to determine whether the secondary pressure continuously exceeds the normal pressure range during a second stabilization time from a start of the supply amount reduction control, and the controller is configured to stop a molding cycle after completion of the molding cycle being executed based on the determination.

11. The injection molding machine according to claim 8,
wherein the gas supply device comprises a gas pipe configured to supply the gas at the secondary pressure to the gas inlet or an on-off device disposed at a gas injection portion, and
wherein the controller is configured to determine whether the secondary pressure continuously exceeds the normal pressure range during a second stabilization time from a start of the supply amount reduction control, and the controller is configured to close the on-off device and stops a molding cycle after completion of the molding cycle being executed based on the determination.

12. The injection molding machine according to claim 1, wherein the controller is configured to determine whether the secondary pressure is less than the normal pressure range and a decrease rate of the secondary pressure is equal to or greater than a fourth threshold, and the controller is configured to stop a molding cycle after completion of the molding cycle being executed based on the determination.

13. The injection molding machine according to claim 1,
wherein the gas supply device comprises a gas pipe configured to supply the gas at the secondary pressure to the gas inlet or an on-off device disposed at a gas injection portion, and
wherein the controller is configured to determine whether the secondary pressure is less than the normal pressure range and a decrease rate of the secondary pressure is equal to or greater than a fourth threshold, and the controller is configured to close the on-off device and stop a molding cycle after completion of the molding cycle being executed based on the determination.

14. The injection molding machine according to claim 1,
wherein a feeder configured to adjust a supply amount of an injection material is attached to the heating cylinder, and
wherein the controller is configured to determine whether the secondary pressure is greater than a value that is obtained by subtracting a fifth threshold, which is greater than the second threshold, from the set pressure, and a decrease rate of the secondary pressure is equal to or greater than a fourth threshold, and the controller is configured to perform supply amount increase control including increasing the supply amount of the injection material by controlling the feeder based on the determination.

15. The injection molding machine according to claim 14, wherein the controller is configured to determine whether the decrease rate of the secondary pressure temporarily exceeds the fourth threshold during a predetermined cycle from a start of the supply amount increase control or during a fourth stabilization time from the start of the supply amount increase control, and the controller is configured to stop a molding cycle after completion of the molding cycle being executed based on the determination.

16. The injection molding machine according to claim 14, wherein the gas supply device comprises a gas pipe configured to supply the gas at the secondary pressure to the gas inlet or an on-off device disposed at a gas injection portion, and
wherein the controller is configured to determine whether the decrease rate of the secondary pressure temporarily exceeds the fourth threshold during a predetermined cycle from a start of the supply amount increase control or during a fourth stabilization time from the start of the supply amount increase control, and the controller is configured to close the on-off device and stop a molding cycle after completion of the molding cycle being executed based on the determination.

17. The injection molding machine according to claim 1, wherein the controller is configured to determine whether the secondary pressure is equal to or less than a value that is obtained by subtracting a fifth threshold, which is greater than the second threshold, from the set pressure, and the controller is configured to stop a molding cycle after completion of the molding cycle being executed based on the determination.

18. The injection molding machine according to claim 1, wherein the gas supply device comprises a gas pipe configured to supply the gas at the secondary pressure to the gas inlet or an on-off device disposed at a gas injection portion, and
wherein the controller is configured to determine whether the secondary pressure is equal to or less than a value that is obtained by subtracting a fifth threshold, which is greater than the second threshold, from the set pressure, and the controller is configured to close the on-off device and stop a molding cycle after completion of the molding cycle being executed based on the determination.

19. The injection molding machine according to claim 1, wherein the controller is configured to determine whether the secondary pressure falls below the normal pressure range but is greater than a value that is obtained by subtracting a fifth threshold, which is greater than the second threshold, from the set pressure, and a decrease rate of the secondary pressure is less than a fourth threshold, and the controller is configured to issue an alarm for prompting replacement of the gas supply source based on the determination.

20. The injection molding machine according to claim 1, wherein the gas supply device comprises:
a plurality of the gas supply sources; and
a gas supply source switching device configured to selectively switch one gas supply source to be used from the plurality of gas supply sources, and wherein in a case where the secondary pressure falls below the normal pressure range but is greater than a value that is obtained by subtracting a fifth threshold, which is greater than the second threshold, from the set pressure, and a decrease rate of the secondary pressure is less than a fourth threshold, the controller switches the gas supply source currently being used to another gas supply source by the gas supply source switching device.

21. The injection molding machine according to claim 1, wherein the controller comprises a pressure controller configured to control the pressure adjustment device, and
wherein the controller is configured to determine whether the secondary pressure falls below the normal pressure range but is greater than a value that is obtained by subtracting a fifth threshold, which is greater than the second threshold, from the set pressure, and a decrease rate of the secondary pressure is less than a fourth threshold, and the controller is configured to perform pressure increase control to cause the secondary pressure to fall within the normal pressure range by the pressure controller based on the determination.

22. The injection molding machine according to claim 21, wherein the controller is configured to determine whether the secondary pressure falls below the normal pressure range and is maintained at a value greater than a value that is obtained by subtracting the fifth threshold from the set pressure during a third stabilization time from a start of the pressure increase control, the controller is configured to issue an alarm for prompting replacement of the gas supply source based on the determination.

23. The injection molding machine according to claim 21, wherein the gas supply device comprises:
a plurality of the gas supply sources; and
a gas supply source switching device configured to selectively switch one gas supply source to be used from the plurality of gas supply sources, and
wherein the controller is configured to determine whether the secondary pressure falls below the normal pressure range and is maintained at a value greater than a value that is obtained by subtracting the fifth threshold from the set pressure during a third stabilization time from a start of the pressure increase control, and the controller is configured to switch the gas supply source currently being used to another gas supply source by the gas supply source switching device based on the determination.

24. The injection molding machine according to claim 1, wherein the gas supply device comprises:
a plurality of the gas supply sources;
a gas supply source switching device configured to selectively switch one gas supply source to be used from the plurality of gas supply sources; and
a primary pressure detection device configured to detect the primary pressure of the gas from the gas supply source, and
wherein the controller is configured to:
detect a pressure decrease in the gas supply source by comparing a difference between the primary pressure and the set pressure or the secondary pressure; and
based on detecting the pressure decrease in the gas supply source, switch the gas supply source currently being used to another gas supply source by the gas supply source switching device.

25. The injection molding machine according to claim 1, further comprising:

an injection material detection device configured to confirm a supply of an injection material to the heating cylinder, wherein the injection material detection device is configured to determine whether the injection material is interrupted and an injection material shortage is detected, and the injection material detection device is configured to stop a molding cycle after completion of the molding cycle being executed based on the determination.

26. The injection molding machine according to claim 1, further comprising:

an injection material detection device configured to confirm a supply of an injection material to the heating cylinder, wherein the gas supply device comprises a gas pipe configured to supply the gas at the secondary pressure to the gas inlet or an on-off device disposed at a gas injection portion, and wherein the injection material detection device is configured to determine whether the injection material is interrupted and an injection material shortage is detected, and the injection material detection device is configured to close the on-off device and stops a molding cycle after completion of the molding cycle being executed based on the determination.

27. The injection molding machine according to claim 9, wherein the control is configured to determine whether the secondary pressure continuously exceeds the normal pressure range during a second stabilization time from a start of the supply amount reduction control, and the controller is configured to stop a molding cycle after completion of the molding cycle being executed based on the determination.

28. The injection molding machine according to claim 9, wherein the gas supply device comprises a gas pipe configured to supply the gas at the secondary pressure to the gas inlet or an on-off device disposed at a gas injection portion, and wherein the controller is configured to determine whether the secondary pressure continuously exceeds the normal pressure range during a second stabilization time from a start of the supply amount reduction control, and the controller is configured to close the on-off device and stop a molding cycle after completion of the molding cycle being executed based on the determination.

29. A method for controlling the injection molding machine of claim 1, the method comprising:

detecting an abnormality by comparing a set pressure with the secondary pressure.

\* \* \* \* \*